United States Patent
Dachiku et al.

(10) Patent No.: US 8,428,444 B2
(45) Date of Patent: Apr. 23, 2013

(54) VIDEO SERVER AND SEAMLESS PLAYBACK METHOD

(75) Inventors: Kenshi Dachiku, Kawasaki (JP); Kenichi Kiura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 13/210,071

(22) Filed: Aug. 15, 2011

(65) Prior Publication Data
US 2012/0163779 A1    Jun. 28, 2012

(30) Foreign Application Priority Data
Dec. 27, 2010  (JP) ................. 2010-291092

(51) Int. Cl.
*H04N 5/783*    (2006.01)
(52) U.S. Cl.
USPC .......................................... 386/343; 386/345
(58) Field of Classification Search ........... 386/343–352
See application file for complete search history.

(56) References Cited

U.S. PATENT DOCUMENTS
2007/0212029 A1    9/2007  Hitoshi
2008/0298769 A1*   12/2008 Johnson et al. ............. 386/68

FOREIGN PATENT DOCUMENTS
| JP | 2001-268517 A | 9/2001 |
|---|---|---|
| JP | 2007-235548 | 9/2007 |
| JP | 2007-235548 A | 9/2007 |
| JP | 2010-034994 A | 2/2010 |
| JP | 2010-074707 A | 4/2010 |

OTHER PUBLICATIONS

First Office Action mailed by Japan Patent Office on Dec. 11, 2012 in the corresponding to Japanese patent application No. 2010-291092.

* cited by examiner

*Primary Examiner* — Thai Tran
*Assistant Examiner* — Nigar Chowdhury
(74) *Attorney, Agent, or Firm* — Knobbe, Martens, Olson & Bear LLP

(57) ABSTRACT

According to one embodiment, a video server includes a storage unit, an output processing unit, and a decoding processing unit. The storage unit stores first video data items and second video data items. The output processing unit generates first and second data blocks based on the first video data items and the second video data item read from the storage unit, respectively. The output processing unit outputs the first data blocks in fewer frames than usual, and outputs the second data block in vacant frame. The decoding processing unit decodes the first data blocks to generate a first playback signals, and outputs the first playback signals. The decoding processing unit stores the second data blocks.

4 Claims, 3 Drawing Sheets

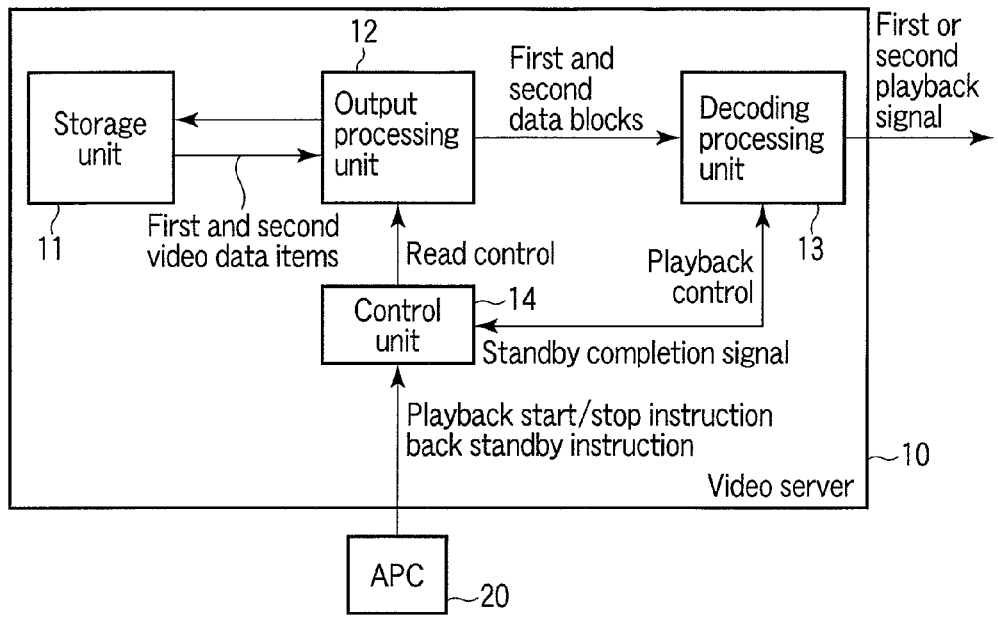
F I G. 1
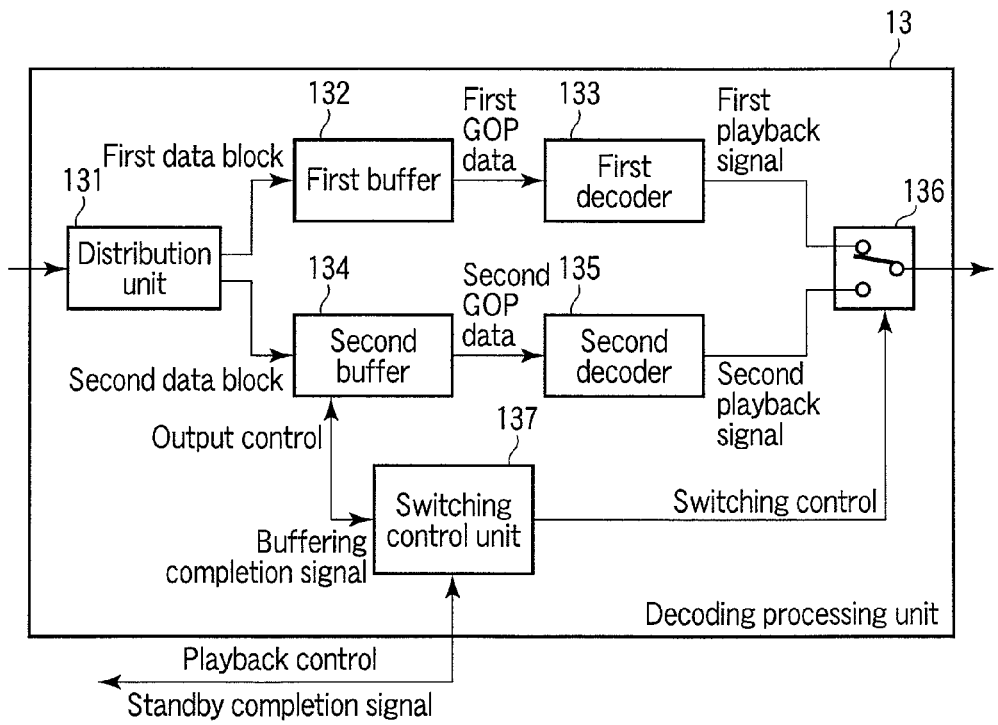
F I G. 2

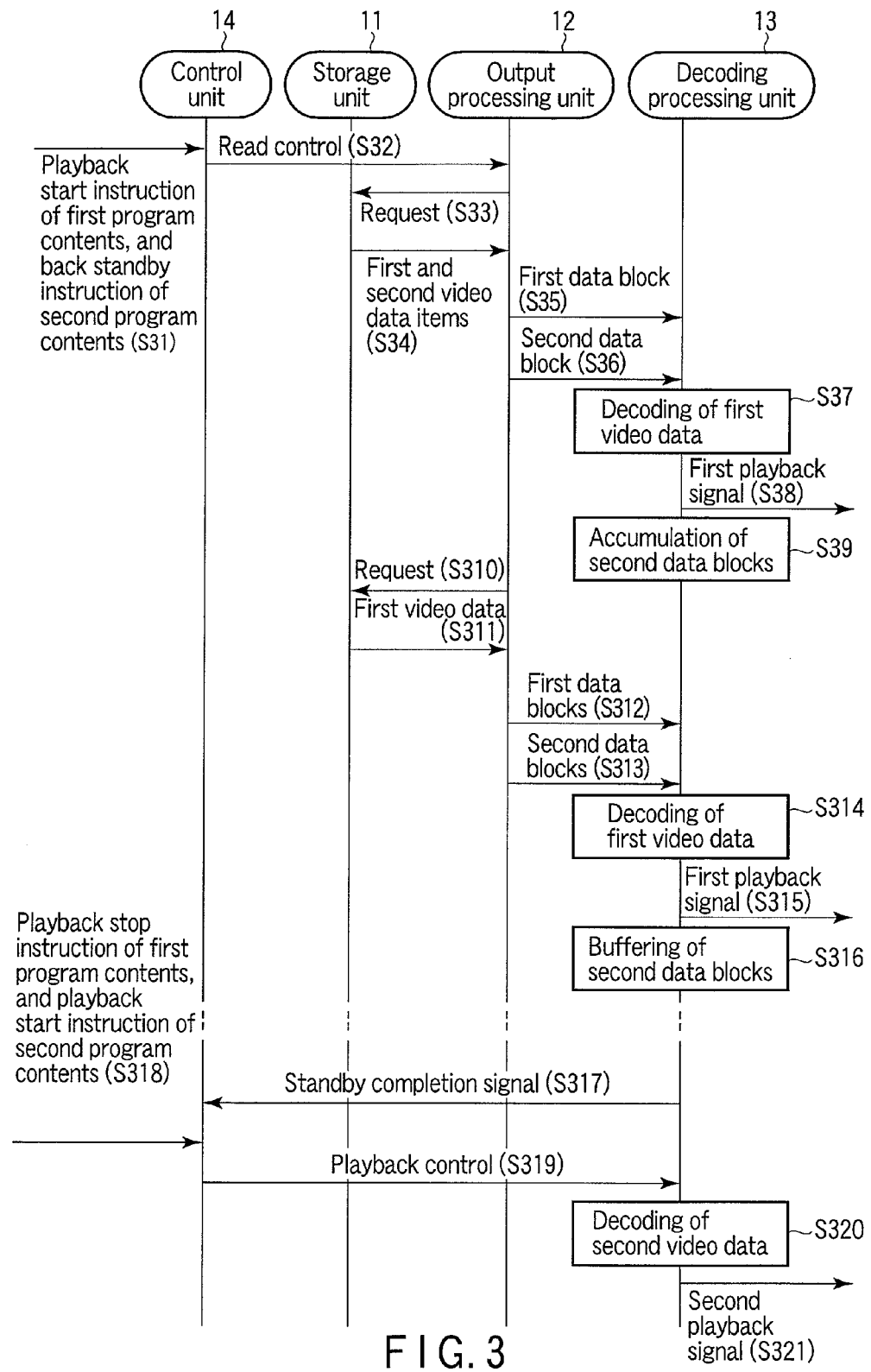
F I G. 3

VIDEO SERVER AND SEAMLESS PLAYBACK METHOD

CROSS-REFERENCE TO RELATED APPLICATIONS

This application is based upon and claims the benefit of priority from prior Japanese Patent Application No. 2010-291092, filed Dec. 27, 2010, the entire contents of which are incorporated herein by reference.

FIELD

Embodiments described herein relate generally to a video server and seamless playback method.

BACKGROUND

In general, a video server records program contents compression-coded by a predetermined method. In recent years, the MPEG-2 method is known as a standard method of compression coding.

In an MPEG-2 stream, a unit called a Group Of Pictures (GOP) is treated as an independently accessible minimum unit. The GOP is constituted of one or a plurality of pictures. A GOP constituted of only one I picture is called a single GOP. A GOP constituted of a plurality of pictures formed of an I picture, and P and/or B picture is called a long GOP.

Incidentally, in the conventional video server, when playback of first program contents composed of the single GOP is switched to that of second program contents composed of the long GOP, the user must wait until video data corresponding to the long GOP is buffered after the switching to the second program contents. Therefore, the playback of the first program contents might not be switched to that of the second program contents in a seamless manner.

BRIEF DESCRIPTION OF THE DRAWINGS

FIG. 1 is a block diagram showing the functional configuration of a video server according to an embodiment.

FIG. 2 is a block diagram showing the functional configuration of the decoding processing unit in FIG. 1.

FIG. 3 is a sequence diagram showing operations to be carried out when the video server in FIG. 1 switches playback of the first program contents to that of the second program contents.

DETAILED DESCRIPTION

Figure 4:
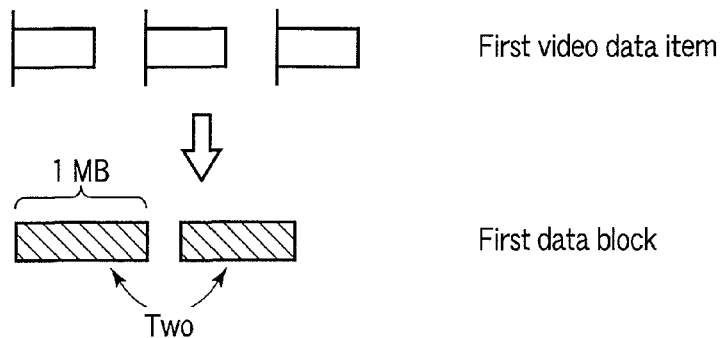
FIG. 4 is a view showing a first data block generated by the output processing unit in FIG. 1.

In general, according to one embodiment, a video server includes a storage unit, an output processing unit, and a decoding processing unit. The storage unit stores first video data items and second video data items. The first video data items are obtained by encoding of a image in each frame using intra-screen coding. The second video data items are obtained by compression encoding of images in a plurality of frames using inter-frame compression based on predictive coding. The output processing unit generates first and second data blocks. The first data block is generated by combining predetermined number of the first video data items read from the storage unit. The second data block is generated by dividing the second video data item read from the storage unit. The output processing unit outputs the first data blocks in fewer frames than frames in which the predetermined number of the first video data items are read, and outputs the second data block in a vacant frame. The vacant frame is obtained based on a difference between the frames in which the first data blocks are output and the frames in which the first video data items are read. The decoding processing unit decodes the first data blocks to generate a first playback signals, and outputs the first playback signals. The decoding processing unit stores the second data blocks.

First Embodiment

Hereinafter, an embodiment will be described below with reference to the drawings.

FIG. 1 is a block diagram showing the functional configuration of a video server 10 according to this embodiment. The video server shown in FIG. 1 is provided with a storage unit 11, output processing unit 12, decoding processing unit 13, and control unit 14.

The storage unit 11 is provided with a plurality of flash memories. The storage unit 11 previously stores therein a plurality of contents including first and second program contents. The first program contents is composed of single GOPs. The single GOP implies a GOP constituted only of one Intra Picture (I picture). The single GOP corresponds to a first video data item. It should be noted that the I picture is obtained when an image in each frame is encoded by intra-screen coding.

Further, the second program contents are composed of long GOPs. The long GOP implies a GOP constituted of an I picture, and Predictive Picture and/or Bi-directionally predictive Picture (P and/or B picture). The long GOP corresponds to a second data item composed of, for example fifteen pictures. It should be noted that a P picture and B picture are obtained by forward prediction and bilateral prediction, respectively.

The output processing unit 12 reads a predetermined number of first video data items and a second video data item from the storage unit 11 in accordance with read control from the control unit 14.

The output processing unit 12 is connected to the decoding processing unit 13 by a LAN cable using Ethernet (registered trade name) or the like. The output processing unit 12 outputs one data block of a predetermined amount for each frame (for example, 0.033 s) to the decoding processing unit 13 through the LAN cable. In this embodiment, the predetermined amount is defined as, for example, 1 MB at maximum.

In particular, the output processing unit 12 combines the set number of first video data items read from the storage unit 11 to generate a plurality of first data blocks. The amount of first data blocks is 1 MB at a maximum. Further, the output processing unit 12 divides the second video data item read from the storage unit 11 to generate a plurality of second data blocks. The amount of second data blocks is 1 MB at maximum.

The output processing unit 12 outputs the first data block to the decoding processing unit 13 for each frame. When the first data blocks obtained by combining a set number of first video data items are output to the decoding processing unit 13, with one block in each frame, a vacant time corresponding to at least one frame is created, as compared with the case where the first video data items of the set number are output, with one first video data item in each frame. The output processing unit 12 outputs the second data block to the decoding processing unit 13 in the vacant frame.

FIG. 2 is a block diagram showing the functional configuration of the decoding processing unit 13 according to this embodiment. The decoding processing unit 13 shown in FIG. 2 is provided with a distribution unit 131, first buffer 132, first decoder 133, second buffer 134, second decoder 135, switching unit 136, and switching control unit 137.

The distribution unit 131 outputs the first data blocks supplied from the output processing unit 12 to the first buffer 132, and outputs the second data blocks supplied from the output processing unit 12 to the second buffer 134.

The first buffer 132 receives the first data blocks and, stores the first data blocks until the amount of buffered first data blocks becomes an amount corresponding to one I picture. The first buffer 132 outputs the buffered first data blocks of the amount corresponding to one I picture to the first decoder 133 as first GOP data.

The first decoder 133 decodes the first GOP data supplied from the first buffer 132, and generates a first playback signal. The first decoder 133 outputs the first playback signal to the switching unit 136. As the first GOP data is constituted of an I picture, the first GOP data can be decoded by itself.

The second buffer 134 stores the second data blocks supplied from the distribution unit 131. When the second data blocks are buffered to an amount corresponding to 1 GOP, the second buffer 134 outputs an buffering completion signal to the switching control unit 137. Further, the second buffer 134 outputs the buffered second data blocks to the second decoder 135 as the second GOP data in accordance with output control from the switching control unit 137.

The second decoder 135 decodes the second GOP data supplied from the second buffer 134, and generates a second playback signal. The second decoder 135 outputs the second playback signal to the switching unit 136. The P picture is decoded based on an I picture or a P picture received before. Further, the B picture is decoded based on two pictures, such as I pictures or P pictures, received immediately before and after the B picture.

The switching unit 136 outputs the first playback signal or the second playback signal selectively by switching the connection in accordance with switching control from the switching control unit 137.

Upon receiving the buffering completion signal from the second buffer 134, the switching control unit 137 outputs a standby completion signal indicating that preparation for switching of the program contents has been completed to the control unit 14. Further, in accordance with playback control from the control unit 14, the switching control unit 137 carries out output control for the second buffer 134, and carries out switching control for the switching unit 136.

The control unit 14 shown in FIG. 1 is connected to an Automatic Program Controller (APC) 20. The APC 20 instructs the control unit 14 to start/stop playback of the first and second program contents stored in the storage unit 11 on the basis of the broadcast program supplied from outside, and date/time measured by a station clock. Further, the APC 20 instructs the control unit 14 to start the background standby of the second program contents stored in the storage unit 11 on the basis of the broadcast program, and date/time. The background standby indicates a process for preparing the playback of the second program contents in the background during the playback of the first program contents.

When a playback start instruction of the first program contents is received from the APC 20, the control unit 14 carries out read control with the purpose of reading the first program contents for the output processing unit 12, and carries out playback control with the purpose of playing back the first program contents for the switching control unit 137. Further, when a background standby instruction of the second program contents is received from the APC 20, the control unit 14 carries out read control with the purpose of reading the second program contents for the output processing unit 12.

When the control unit 14 receives a playback start instruction of the second program contents supplied from the APC 20 and a standby completion signal supplied from the switching control unit 137, the control unit 14 carries out playback control with the purpose of playing back the second program contents for the switching control unit 137. It should be noted that when the control unit 14 receives only the playback start instruction of the second program contents supplied from the APC 20, the control unit 14 carries out read control with the purpose of reading the second program contents for the output processing unit 12, and carries out playback control with the purpose of playing back the second program contents for the switching control unit 137.

Next, operations which the video server configured as described above carries out by switching between the first and second program contents will be described below in detail.

FIG. 3 is a sequence diagram showing operations to be carried out by the video server 10 according to this embodiment to switch the playback of the first program contents to the playback of the second program contents. In FIG. 3, it is assumed that the output processing unit 12 reads the first video data items corresponding to three pictures from the storage unit 11 in accordance with read control from the control unit 14.

First, the control unit 14 receives a playback start instruction of the first program contents, and background standby instruction of the second program contents from the APC 20 (sequence S31). The control unit 14 carries out read control with the purpose of reading the first program contents for the output processing unit 12 in accordance with the playback start instruction, and carries out read control with the purpose of reading the second program contents for the output processing unit 12 in accordance with the background standby instruction (sequence S32).

Upon receiving the read control of the first and second program contents, the output processing unit 12 requests the storage unit 11 to output thereto the first video data items corresponding to three pictures, and second video data item (sequence S33).

In accordance with the request from the output processing unit 12, the storage unit 11 outputs the first video data items corresponding to three pictures, and second video data item to the output processing unit 12 (sequence S34).

Figure 6:
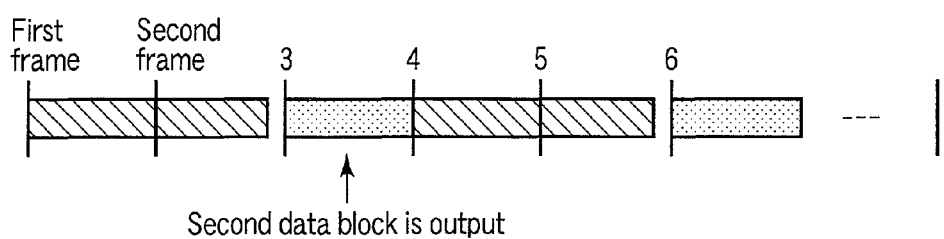
FIG. 6 is a view showing the first and second data blocks output by the output processing unit in FIG. 1.

As shown in FIG. 4, the output processing unit 12 generates two first data blocks each having an amount of 1 MB at maximum based on the first video data items corresponding to three pictures output from the storage unit 11. The output processing unit 12 outputs the generated first data blocks to the decoding processing unit 13 at first and second frames as shown in FIG. 6 (sequence S35).

Figure 5:
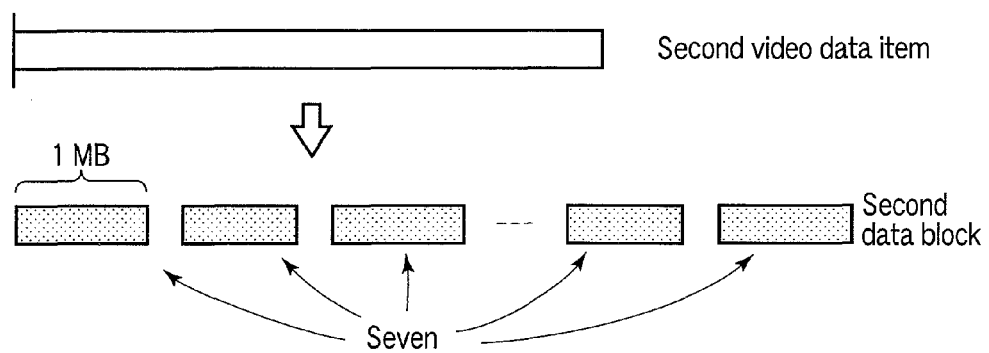
FIG. 5 is a view showing a second data block generated by the output processing unit in FIG. 1.

As shown in FIG. 5, the output processing unit 12 generates second data blocks each having an amount of 1 MB at maximum based on the second video data item output from the storage unit 11. The output processing unit 12 outputs the generated second data block to the decoding processing unit 13 at a third frame as shown in FIG. 6 (sequence S36). It should be noted that seven second data blocks each having an amount of 1 MB at maximum are generated based on the second video data item constituted of an I picture, P picture, and B picture corresponding to fifteen pictures (1 GOP).

Normally, the first video data item corresponding to one picture is output for each frame, and hence when it is intended to output the first video data items corresponding to three pictures to the decoding processing unit 13, three frames are required. According to FIG. 6, the two first data blocks corresponding to three pictures are output at two frames. Accordingly, a vacant frame corresponding to one frame appears. The output processing unit 12 improves the efficiency of data transfer by outputting the second data block in the vacant frame.

The first buffer 132 stores the first data blocks, and outputs a first GOP data to the first decoder 133 when the amount of buffered first data blocks becomes an amount corresponding to one I picture. The first decoder 133 decodes the first GOP data with the lapse of each frame to generate a first playback signal (sequence S37). The first decoder 133 outputs the first playback signal through the switching unit 136 (sequence S38). At this time, the second buffer 134 stores the second data block supplied from the output processing unit 12 (sequence S39).

Subsequently, the output processing unit 12 requests the storage unit 11 to output thereto the first video data items corresponding to the next three pictures (sequence S310). In accordance with the request from the output processing unit 12, the storage unit 11 outputs the first video data items corresponding to three pictures to the output processing unit 12 (sequence S311).

Like in sequence S35, the output processing unit 12 generates first data blocks, and outputs two first data blocks to the decoding processing unit 13 at fourth and fifth frames (sequence S312). Further, the output processing unit 12 outputs the generated second data block to the decoding processing unit 13 at a sixth frame (sequence S313).

The first buffer 132 stores the first data blocks, and outputs a first GOP data to the first decoder 133 when the amount of buffered first data blocks becomes an amount corresponding to one I picture. The first decoder 133 decodes the first GOP data in each frame to generate a first playback signal (sequence S314). The first decoder 133 outputs the first playback signal through the switching unit 136 (sequence S315). At this time, the second buffer 134 stores the second data block supplied from the output processing unit 12 (sequence S316).

The output processing unit 12 and decoding processing unit 13 repeat the processing from sequence S310 to sequence S316. When the amount of buffered second data blocks in the second buffer 134 becomes the amount corresponding to fifteen pictures, the switching control unit 137 outputs a standby completion signal to the control unit 14 (sequence S317).

In the state where the standby completion signal is received from the decoding processing unit 13, when a playback stop instruction of the first program contents and a playback start instruction of the second program contents are received from the APC 20 (sequence S318), the control unit 14 carries out playback control to playback the second program contents for the decoding processing unit 13 (sequence S319).

The second buffer 134 outputs the buffered second data blocks to the second decoder 135 as the second GOP data in accordance with output control from the switching control unit 137. The second decoder 135 decodes the second GOP data supplied from the second buffer 134 to generate a second playback signal (sequence S320). The decoding processing unit 13 outputs the second playback signal through the switching unit 136 (sequence S321).

As described above, in the embodiment described above, the output processing unit 12 combines the first video data items of the set number to generate the first data blocks of a predetermined amount. The output processing unit 12 divides the second video data item to generate the second data blocks of the predetermined amount. The output processing unit 12 outputs the first data blocks to the decoding processing unit 13 in a fewer frames than the conventional unit does. The output processing unit 12 outputs the second data block to the decoding processing unit 13 in the vacant frame caused after the frame in which the first data blocks are output.

In the conventional video server, the output processing unit outputs the first video data item of one picture to the decoding processing unit in each frame. At this time, only one data item could be output in one frame, and hence however small the amount of first video data item was, it was not possible to output the other data in the same frame.

Conversely, in the video server according to this embodiment, the first video data items are combined to generate the first data blocks, whereby the number of frames in which the first data blocks are output becomes lower than that of frames in which the first video data items are output. Accordingly, it becomes possible for the video server to output the second data block in the vacant frame. Thereby, it becomes possible for the video server to prepare for the playback of the second program contents during the playback of the first program contents.

Therefore, according to the video server associated with this embodiment, it is possible to switch playback from the first program contents composed of the single GOP to the second program contents composed of the long GOP in a seamless manner without any underflow.

It should be noted that in the embodiment described above, the case where the video data items corresponding to three pictures are output from the storage unit 11 collectively has been described as an example. However, the above description is not limited to this, and even a case where the first video data items corresponding to two to fifteen pictures are output from the storage unit 11 collectively can also be implemented in the same manner. However, when the first video data items corresponding to, for example, four pictures are output from the storage unit 11 collectively, one of four frames is a vacant frame, and therefore the number of vacant frames is small, as compared with the case where three pictures are collectively output. Thus, it takes a longer time to prepare for the playback of the second program contents in the background when the first program contents are being played back. At this time, part of the second program contents to be broadcast next may be buffered in the second buffer 134 in advance.

Further, in the embodiment described above, although the case where the amount of data blocks to be output from the output processing unit 12 to the decoding processing unit 13 through the LAN cable is 1 MB at maximum has been described as an example, the above embodiment is not limited to this.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video server comprising:
a storage unit configured to store first video data items and second video data items, the first video data items comprising a first plurality of frames encoded using intra-screen coding, the second video data items comprising a second plurality of frames encoded using inter-frame compression based on predictive coding;

a processor configured to generate first and second data blocks, the first data block generated by combining a first number of first video data items from the storage unit, the second data block being generated by dividing a second video data item read from the storage unit;

the processor configured to output the first data blocks in fewer frames than frames in which the first number of first video data items are read, and to output the second data block in a vacant frame, the vacant frame obtained based on a difference between the frames in which the first data blocks are output and the frames in which the first video data items are read; and a decoder configured to decode the first data blocks to generate first playback signals, output the first playback signals, and buffer the second data blocks.

2. The video server according to claim 1, further comprising a controller configured to carry out playback control for the decoder when an instruction and a standby completion signal are received, the instruction comprising an instruction to switch broadcast from first program contents constituted of the first video data to second program contents constituted of the second video data, and the standby completion signal indicating that preparation for switching of the broadcast has been completed, wherein the decoder outputs a standby completion signal to the control section when the decoder stores the second data blocks corresponding to the second video data item, and wherein the decoder decodes the stored second data blocks to generate second playback signals and outputs the generated second playback signals when the decoder receives the playback control from the controller.

3. The video server according to claim 1, wherein the decoder comprises a buffer configured to store the second data blocks, and part of the second data blocks are held in advance in the buffer.

4. A seamless playback method comprising:

storing, in a storage unit, first video data items and second video data items, the first video data items comprising a first plurality of frames encoded using intra-screen coding, the second video data items comprising a second plurality of frames encoded using inter-frame compression based on predictive coding;

reading, from the storage unit, a first number of first video data items, and reading a second video data item;

generating first and second data blocks, the first data block being generated by combining the first number of first video data items, the second data block being generated by dividing the read second video data item;

outputting the first data blocks in fewer frames than frames in which the first number of first video data items are read, and outputting the second data block in a vacant frame, the vacant frame obtained based on a difference between the frames in which the first data blocks are output and the frames in which the first video data items are read;

playing back first playback signals by decoding the first data blocks;

buffering the second data blocks;

generating a standby completion signal indicating that preparation for switching of broadcast has been completed when the second data blocks corresponding to the amount of second video data are buffered; and playing back second playback signals by decoding the buffered second data blocks instead of the playback of the first playback signals when an instruction to switch the broadcast from first program contents constituted of the first video data to second program contents constituted of the second video data is received, the instruction to switch received after the standby completion signal is generated.

\* \* \* \* \*